(12) United States Patent
Van Haver (10) Patent No.: US 7,764,865 B2
(45) Date of Patent: Jul. 27, 2010

(54) EXTRA MARGINS FOR RECORD TIME INTERVAL VIA EPG

(75) Inventor: David Albert Lea Van Haver, Bruges (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1979 days.

(21) Appl. No.: 10/266,303

(22) Filed: Oct. 8, 2002

(65) Prior Publication Data

US 2003/0072559 A1   Apr. 17, 2003

(30) Foreign Application Priority Data

Oct. 12, 2001   (EP) .................................. 01203914

(51) Int. Cl.
*H04N 5/91* (2006.01)
(52) U.S. Cl. .............................. 386/83; 386/46; 386/94
(58) Field of Classification Search ................... 386/83, 386/46, 94
See application file for complete search history.

(56) References Cited

U.S. PATENT DOCUMENTS

| | | | | |
|---|---|---|---|---|
| 4,879,611 A | * | 11/1989 | Fukui et al. ............. | 360/69 |
| 5,187,589 A | * | 2/1993 | Kono et al. ............. | 386/83 |
| 5,307,173 A | * | 4/1994 | Yuen et al. ............. | 386/83 |
| 5,541,738 A | * | 7/1996 | Mankovitz ............. | 386/83 |
| 5,879,611 A | * | 3/1999 | Takahashi et al. ........ | 264/275 |
| 6,240,240 B1 | * | 5/2001 | Nagano et al. .......... | 386/83 |
| 6,344,878 B1 | * | 2/2002 | Emura ................... | 348/460 |
| 7,028,327 B1 | * | 4/2006 | Dougherty et al. ....... | 725/93 |
| 2001/0051037 A1 | * | 12/2001 | Safadi et al. ........... | 386/83 |
| 2002/0191954 A1 | * | 12/2002 | Beach et al. ........... | 386/46 |

OTHER PUBLICATIONS

Patent Abstracts of Japan; vol. 016, No. 442 (p. 1421), Sep. 16, 1992, JP 04153940.
Patent Abstracts of Japan) vol. 018, No. 530 (p. 1809), Oct. 6, 1999, JP06186361A.
Patent Abstracts of Japan) vol. 1997, No. 03, Mar. 31, 1997, JP08J06097A.

* cited by examiner

*Primary Examiner*—Thai Tran
*Assistant Examiner*—Anner Holder (57) ABSTRACT

A system, method, and computer-readable medium which reduce the occurrence of incomplete recordings of television programs by video cassette recorders (VCR) (130), or other types of video recorders, by adding margins (6, 7) to the programmed start and end times (1, 2) of the recording. The margins (6, 7) cause the recording to start earlier than the programmed start time (1) by a specified amount of time ($\Delta T_B$), and to stop later than the programmed stop time by another specified amount of time ($\Delta T_E$). Therefore, when a television program starts a few minutes earlier, or ends a few minutes later than scheduled, the present invention helps ensure that the entire television program will be recorded by the video recorder, despite the fact that the video recorder was programmed in accordance with to the scheduled times (1, 2).

18 Claims, 6 Drawing Sheets

EXTRA MARGINS FOR RECORD TIME INTERVAL VIA EPG

BACKGROUND OF THE INVENTION

A video cassette recorder (VCR) is a device that records television programs on magnetic tape cassettes, and plays back recorded programs on a television set. VCRs can generally be programmed by a user to record the program or programs being broadcast on a particular channel for a specified period of time on a particular date.

1. Field of the Invention

The present invention relates to recording television signals, more particularly to a mechanism for programming the record times for a video cassette recorder.

2. Description of the Prior Art

One method of programming a VCR to record television programs includes a user manually keying in the channel, the start time, the stop time for recording, and the date (the date is not always necessary if the recording is made on the same day). This manual programming of the VCR is usually performed by using keys located on the VCR itself or by using keys on a remote control console.

An alternative method of manually programming the channel and the start and stop times of a VCR recording is to use an electronic program guide (EPG) that is displayed on a television set. An EPG displays information about television programs scheduled to be broadcast. The date, times, and channel for each program are generally displayed by an EPG. Many EPGs allow users to select a particular program listing (by clicking on the listing, for example) to be recorded by a VCR connected to the television system. After a program listing has been selected on such an EPG, the VCR is automatically programmed in accordance with the channel, date, and start and end times, which are stored in the EPG in association with the selected program listing.

This method of using an EPG to program a VCR is usually more convenient than the manual method, because the user does not have to look up the start and stop times and the channel for a program that he/she wishes to record. However, EPGs are not always available to users who do not subscribe to a special television broadcast system (e.g. cable or satellite systems) and want to record programs being transmitted through conventional television antenna signals.

When programming a VCR in accordance with either one of the above methods, a problem may arise if the television program to be recorded starts and/or ends at a different time than was originally scheduled. Such deviations from the scheduled times may cause part of the television program to be broadcast outside the programmed recording time interval, resulting in an incomplete recording.

Figure 1:
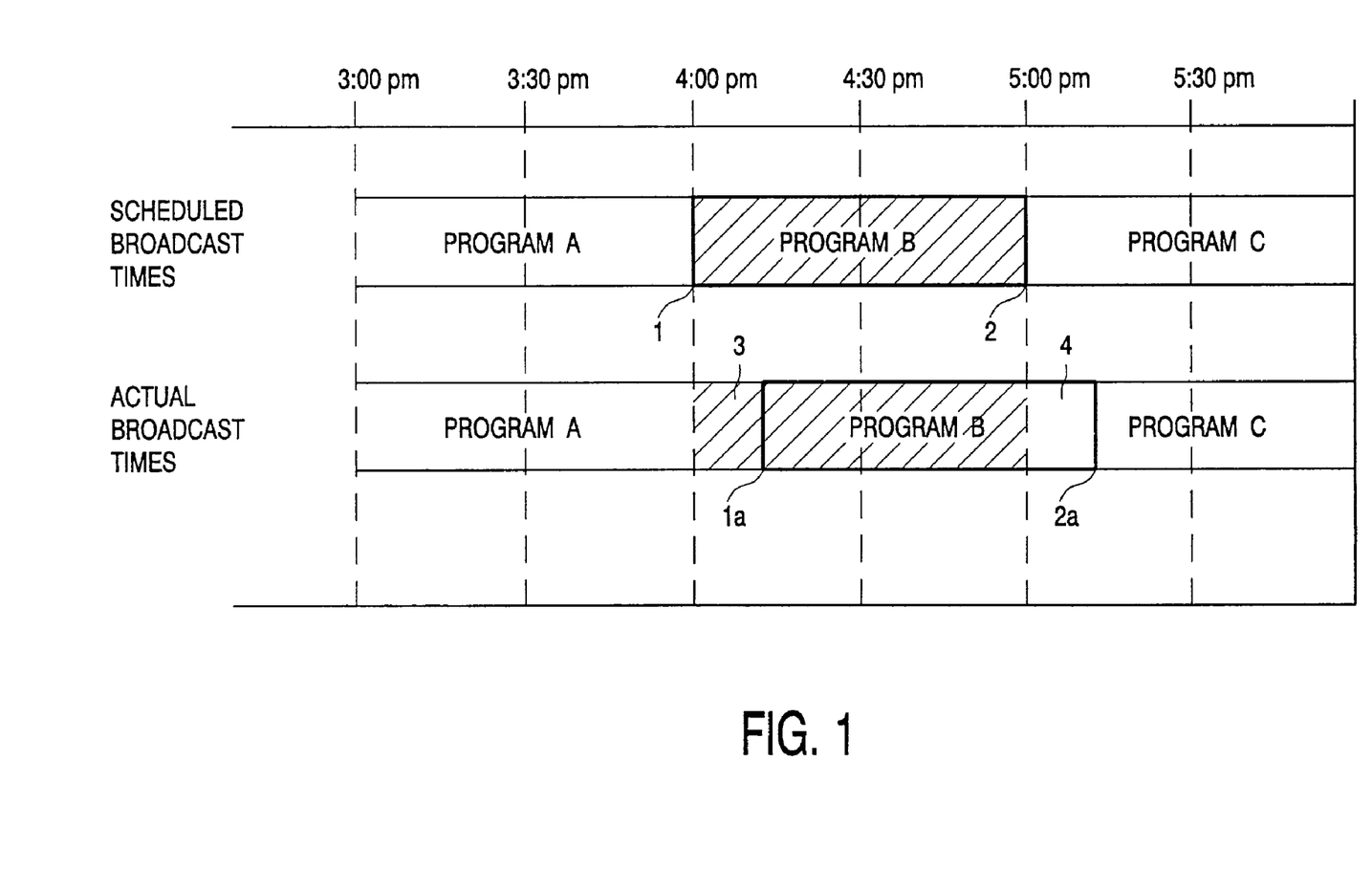
FIG. 1 illustrates a situation in which a television program is not recorded in its entirety due to an unscheduled delay of its starting time.

FIG. 1 is illustrative of such a problem. FIG. 1 shows an example of the scheduled broadcast times for programs on this channel between 3:00 pm and 6:00 pm, and the actual program times due to a particular program (Program A) not ending on time. Suppose a user wants to record Program B on a VCR. The user will program a VCR to record from the scheduled start time 1 of 4:00 pm to the scheduled stop time of 5:00 pm (as indicated by the hatched time interval). As shown by the actual broadcast time line, however, the actual start time 1a and stop time 2a for Program B come after the scheduled start and stop times 1 and 2. Therefore, the VCR will record a portion 3 of Program A, and will omit a portion 4 of Program B.

As shown in FIG. 1, if the preceding television program runs too long, a VCR recording may not record the entire television program that was programmed to be recorded. This sometimes occurs when a previous program is a televised sports events such as football or baseball matches which tend to last longer than their scheduled time (e.g., the match goes into extra time or extra innings). Generally, television networks will televise an entire sports event, even if they go beyond their allotted programming time. However, such delayed start times may also occur due to the broadcasting of important late-breaking news, or other unscheduled programs.

The problem of incomplete television program recordings may also occur if the time kept by the internal clock of the VCR deviates from the actual time, or from the time kept by the broadcasting station or network. For instance, a user may set the VCR's clock such that it runs several minutes fast or slow. Alternatively, the broadcasting network or station may not be keeping accurate time. The lack of synchronization between the VCR's clock and the network or station's clock may cause part of the program to be broadcast outside the recording times of the VCR.

Program Delivery Control (PDC) offers a solution to the above problem. PDC systems control compliant VCRs, and other types of video recorders, in accordance with to teletext codes transmitted by the broadcaster corresponding to each television program. A video recorder under PDC control does not start recording until it receives a PDC code, which is transmitted just before the television program begins. Therefore, if the program is delayed or re-scheduled, the recording of the VCR will automatically be re-scheduled so that nothing of the television program is missed. However, PDC requires a teletext service and is not available to all television viewers, especially to those whose television sets receive programs through conventional antenna signals.

OBJECT AND SUMMARY OF THE INVENTION

It is an object of the present invention to cause a VCR to record an entire program, even when the program's actual start and end times deviate from its scheduled start and end times.

An embodiment of the present invention includes technology for adding time margins to the beginning and end of the time interval for which a VCR is programmed to record. The added time margins cause the VCR to start recording an amount of time set earlier than the programmed start time, and to stop recording an amount of time set later than the programmed stop time.

In a further embodiment of the present invention, the time margins are added to the recording start and stop times that are automatically programmed in the VCR by selecting a program listing in an EPG.

In a further embodiment of the present invention, the time margins are added to the recording start and stop times that are manually programmed in the VCR by a user.

In a further embodiment of the present invention, a user designates the amounts of time corresponding to the time margins that are added to the beginning and end of the time interval for which the VCR is programmed to record.

Advantages of the present invention will become more apparent from the detailed description given hereinafter. However, it should be understood that the detailed description and specific examples, while indicating preferred embodiments of the invention, are given by way of illustration only, because various changes and modifications within the spirit and scope of the invention are apparent to those skilled in the art.

BRIEF DESCRIPTION OF THE DRAWINGS

The present invention will be more fully understood from the detailed description given below and the accompanying drawings which are given by way of illustration only, and thus do not limit the present invention.

DETAILED DESCRIPTION OF EMBODIMENTS

Referring to the drawings, FIG. 1 illustrates a situation in which a television program is not recorded in its entirety due to an unscheduled delay of its starting time. As shown in the Figure, Program A ends several minutes later than its scheduled ending time, causing the actual start time 1a and stop time 2a of Program B to be several minutes later than its scheduled start time 1 and stop time 2. In this situation, a portion 4 of Program B falls outside the programmed recording time interval of a VCR (or other video recorder), which is indicated by the hatched area. Consequently, Program B is not recorded in its entirety.

Figure 2:
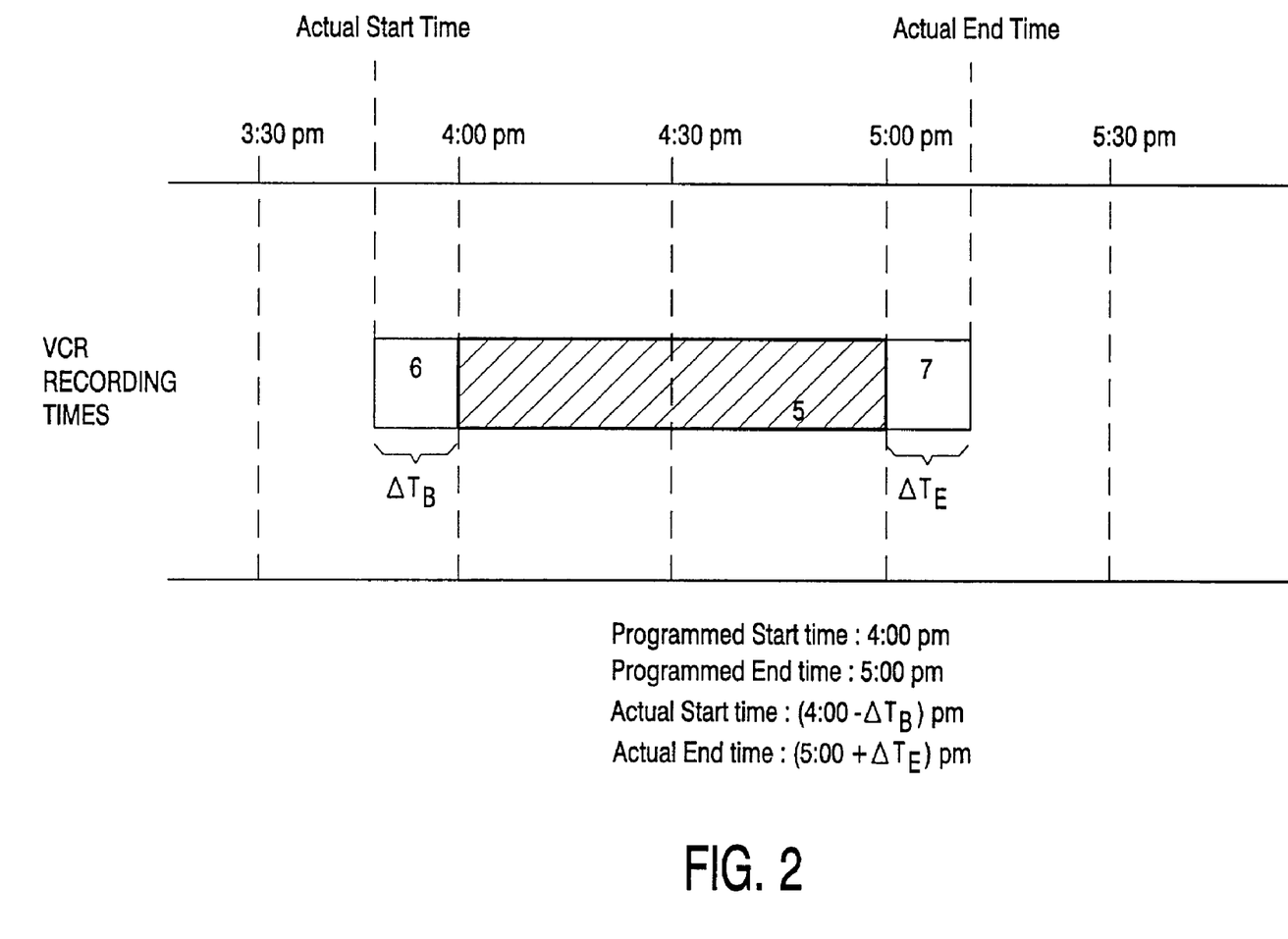
FIG. 2 illustrates the addition of margins to a time interval for which a video recorder is programmed to record, according to an embodiment of the present invention.

FIG. 2 illustrates the addition of margins to a time interval for which a video recorder is programmed to record, according to an embodiment of the present invention. The originally programmed recording time interval 5 is extended by adding a starting time margin 6 and ending time margin 7. These time margins 6 and 7 are added by causing the starting time of the recording time interval 5 to occur a predetermined amount of time $\Delta T_B$ earlier than the originally programmed start time, and by causing the stop time to occur a predetermined amount of time $\Delta T_E$ later than the originally programmed stop time.

Figure 3A:
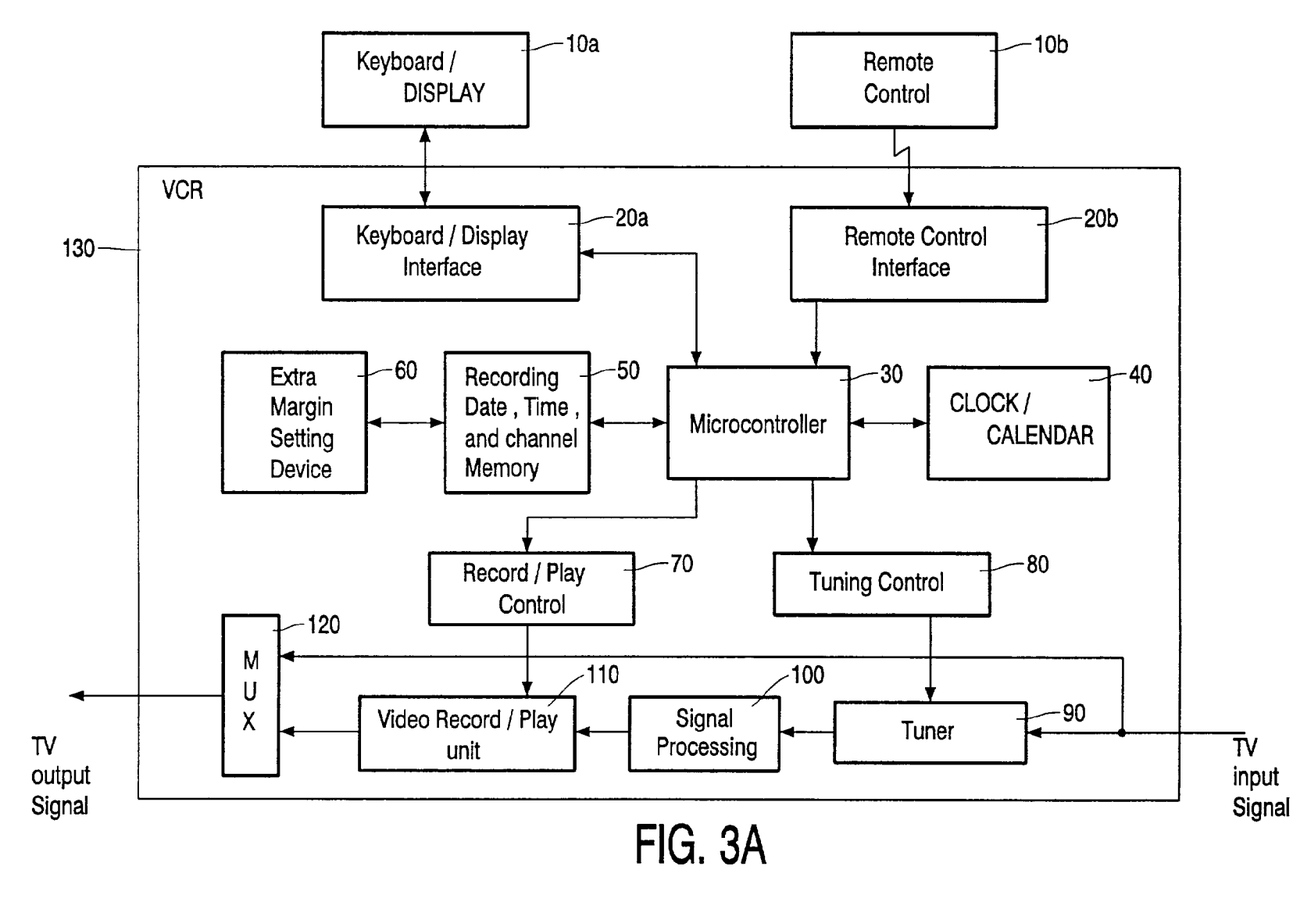
FIG. 3A is a block diagram illustrating an embodiment of the present invention in which margins are added to the programmed recording time interval by a device within the video recorder.

FIG. 3A is a block diagram illustrating an embodiment of the present invention in which margins are added to the programmed recording time interval by a device inside the video recorder. The VCR 130 includes a keyboard/display interface 20a for formatting data received from the combined keyboard/display unit 10a of the VCR. Similarly, the remote control interface 20b formats data received from a remote control console 10b. The formatted data is transmitted to the VCR microcontroller 30, which is connected to a clock/calendar device 40 and a memory 50 for storing programmable recording parameters. The memory 50 is further connected to an extra margin setting device 60. The VCR microcontroller 30 sends instructions to a record/play control unit 70 and a tuning control unit 80, which control the video record/play unit 110 and the tuner 90, respectively of the VCR 130. The TV input signal is input into the tuner 90, processed into a video composite signal by signal processing unit 100, which is then sent to the video record/play unit 110. The video/play unit is connected to the multiplexor 120, which also receives the TV input signal, and outputs a signal to the television.

Figure 3B:
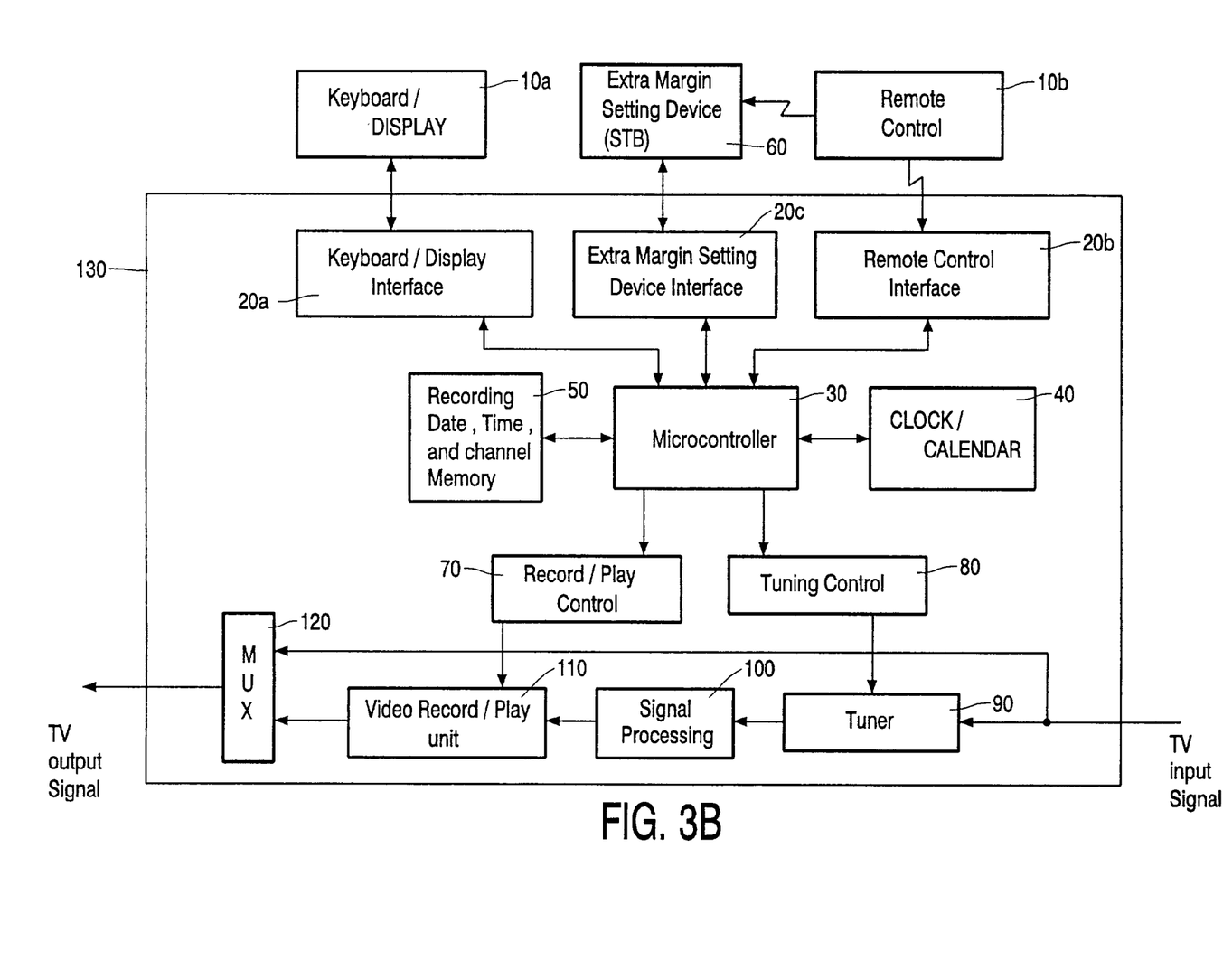
FIG. 3B is a block diagram illustrating an embodiment of the present invention in which margins are added to the programmed recording time interval by a device outside to the video recorder.

FIG. 3B is a block diagram illustrating an embodiment of the present invention in which margins are added to the programmed recording time interval by a device outside the VCR 130. This embodiment differs from that shown in FIG. 3A because the extra margin setting device 60 is located outside the VCR 130, and may be in the form of a set-top box (STB). The VCR 130 includes an interface 20c between the extra margin setting device 60 and the VCR microcontroller 30.

Figure 4:
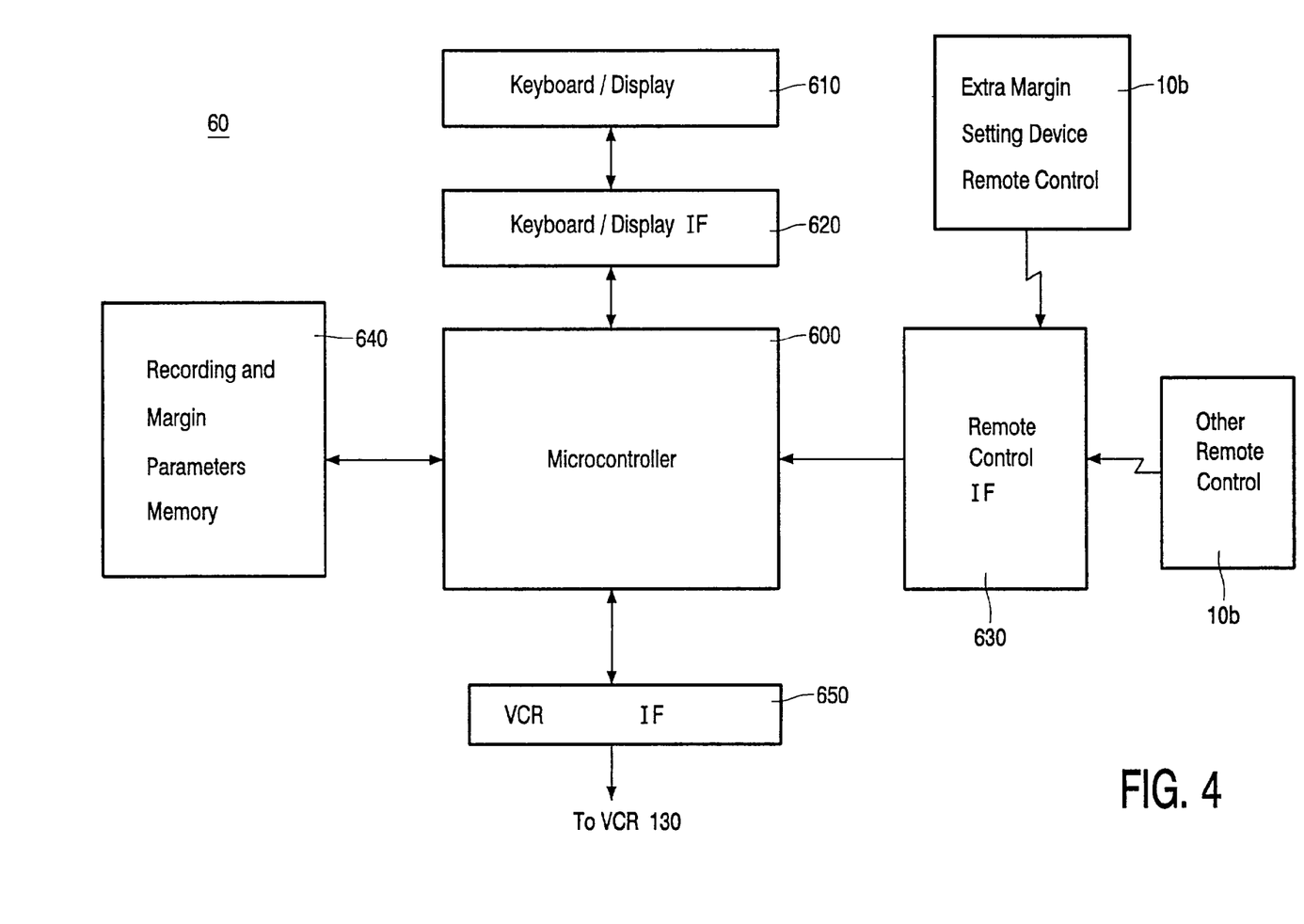
FIG. 4 is a block diagram of the extra margin setting device according to an embodiment of the present invention.

FIG. 4 is a block diagram of the extra margin setting device 60 according to an embodiment of the present invention. A keyboard and display device 610 is connected to an interface 620, which formats any input data into a form usable by device microcontroller 600. Similarly, a remote control interface 630 receives and formats data entered from a remote control. The microcontroller 600 is connected to a memory 640 for storing recording parameters and margin parameters and to an interface 650, which formats and transmits data to the VCR 130.

It should be noted that, while many of the embodiments are described in conjunction with a VCR 130, this is merely for descriptive purposes and in no way limits the present invention to adding margins for the programmed recording times of a VCR 130. The present invention may be used in conjunction with any other type of programmable recorder, which can be programmed to record some type of audio/visual signal during a certain time interval on a certain storage medium. Such recorders may include those that record digital television programs, or presentations being broadcast to personal computers via the Internet, onto a hard disk. Other recorders may also include audio tape recorders that record radio programs on cassette tapes.

Referring to FIG. 2, an embodiment of the present invention relates to adding time margins 6 and 7 to a time interval 5 for which a VCR 130 is programmed to record television programs being broadcast through a specific channel. The programmed recording time interval 5 of the VCR 130 is defined in accordance with a programmed start recording time and stop recording time, which in the example shown in FIG. 2 are 4:00 pm and 5:00 pm, respectively. The extra margins are added to the programmed recording time interval by changing the programmed start recording time to be earlier by an amount of time $\Delta T_B$, and by changing the programmed stop recording time to be later by an amount of time $\Delta T_E$.

It should be noted that in another embodiment, only one time margin is added, either to the beginning or the end of the programmed recording time interval 5. In another embodiment, the amounts of time $\Delta T_B$ and $\Delta T_E$ may be defined by the user via the keyboard 10a on the VCR 130, the remote control 10b, or a keyboard on a set-top box. In an alternative embodiment, $\Delta T_B$ and $\Delta T_E$ may be predefined parameters that cannot be set or modified by users.

In another embodiment, the parameters $\Delta T_B$ and $\Delta T_E$ may or may not be equal to each other. For example, the beginning time margin may be set for $\Delta T_B = 2$ minutes and the end time margin may be set for $\Delta T_E = 10$ minutes, so that the VCR will start recording two minutes earlier and stop recording ten minutes later than programmed.

Referring to FIG. 3A, according to one embodiment of the present invention, these margins 6, 7 are added to the programmed recording time interval 5 by an extra margin setting device 60 integrated in a VCR 130. The VCR microcontroller 30 can receive the programmed recording parameters (i.e., date, start and stop times, and channel) that are set by a user via a keyboard/display unit 10a of the VCR 130 or via remote control 10b.

Alternatively, the recording parameters may be received from EPG software being executed in a set-top box or within the VCR 130.

The VCR microcontroller 30 stores the programmed recording parameters in memory 50. The extra margin setting device 60 accesses these stored parameters from memory 50, and alters the recording start time to be earlier by the amount of time indicated by $\Delta T_B$. Similarly, the extra margin setting device alters the recording stop time to be later by the amount of time indicated by $\Delta T_E$. The altered start and stop times are then stored in memory 50. It should be noted that if either the original start or stop time is close to midnight, the recording start date and recording stop date may also require modification if the added margins cause the start time to occur on an earlier date or cause the stop time to occur on a later date (e.g., when a start time is altered from 12:01 am to 11:59 pm on the preceding day).

When the date and time indicated by the combined clock/calendar device 40 matches a start time and date in memory 50 that corresponds to a programmed recording, the VCR microcontroller 30 sends a control signal to a tuning control unit 80 of the VCR 130 indicating the channel to be tuned, and a control signal to the record/play control unit 70 indicating that recording should start. In response to the control signals of the VCR microcontroller 30, the tuning control unit 80 controls the tuner 90 to tune to the corresponding channel, and the record/play control unit 70 controls the video record/play unit 110 to start recording.

When the date and time indicated by the clock/calendar device 40 matches a stop time and date in memory 50 that corresponds to the programmed recording, the VCR microcontroller 30 sends a control signal to the tuning control unit 80 and the record/play control unit 70 indicating that recording should end. Accordingly, the tuning control unit 70 causes the video record/play unit 110 to stop recording.

Referring to FIG. 3B, according to an alternative embodiment, time margins 6 and 7 are added to a programmed recording time interval 5 by an extra margin setting device 60 outside the VCR 130. In such an embodiment, the VCR 130 executes the operations of programming the recording parameters and recording of television programs similarly as in the embodiment shown in FIG. 3A.

In the embodiment of FIG. 3B, the extra margin setting device 60 may be integrated in the set-top box, which executes EPG software used for automatically programming recordings of the VCR 130. In such a configuration, the extra margin setting device 60 would be able to alter the recording start and stop times (and the start and stop dates, if necessary) indicated by the EPG software, before these recording parameters are transmitted to the VCR 130. The extra margin setting device 60 may also be configured as a standalone device that sends instructions executed by the VCR microcontroller 30 to alter the programmed recording parameters. Alternatively, the extra margin setting device may retrieve the programmed recording parameters from the VCR microcontroller 30, alter these parameters to include the time margins 6 and 7, and send the altered parameters back to the VCR microcontroller 30 to be stored in memory 50.

In the embodiment of FIG. 3B, the extra margin setting device 60 alters the programmed recording time interval 5 of the VCR similar as in the embodiment of FIG. 3A. The recording start time of a programmed recording is caused to be earlier by an amount of time $\Delta T_B$, and the recording stop time is caused to be later by an amount of time $\Delta T_E$. The recording start and stop dates are also changed, if necessary.

The components and configuration of the extra margin setting device are illustrated in FIG. 4. It will be clear to those of ordinary skill that any one of unit blocks 610-650 illustrates any one of a hardware-based component or device, a functional block of an executable computer program, or a combination of the two. The block diagram of FIG. 4 is merely illustrative and should not be construed as limiting the present invention. Those of ordinary skill in the art will realize that the functions of multiple blocks illustrated in FIG. 4 may be performed by a single hardware component or block of instructions. Likewise, those of ordinary skill will realize that functions ascribed to a single block in FIG. 4 may be performed by separate hardware components or software blocks.

It should further be noted that in the embodiment illustrated in FIG. 3A, where the extra margin setting device is integrated in the VCR 130, the functions described below with respect to device microcontroller 600 may be alternatively performed by VCR microcontroller 30.

Figure 5:
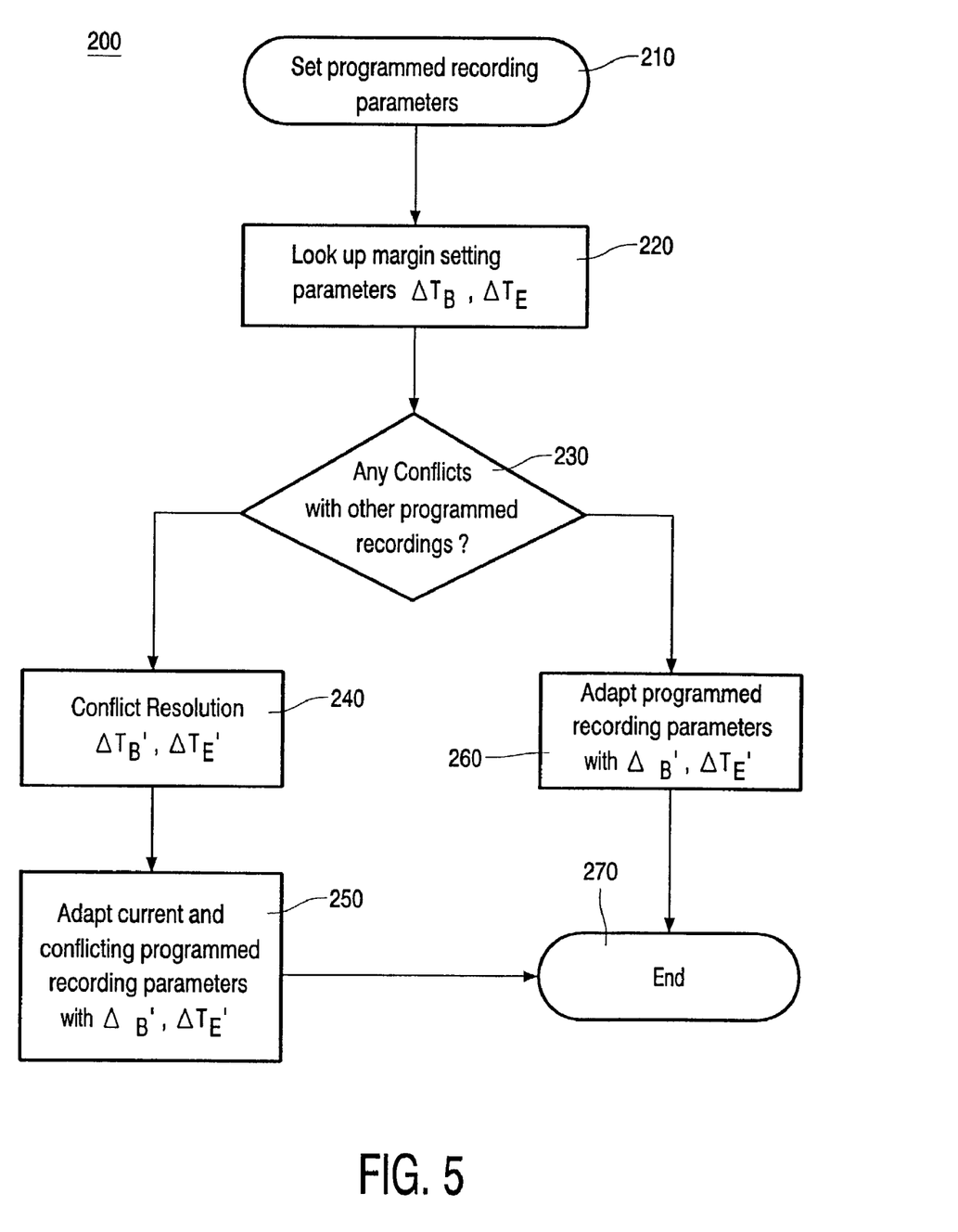
FIG. 5 is a flow chart illustrating the method by which margins are added to the programmed recording time interval of a video recorder.

The operation of the extra margin setting device 60 will now be described with respect to the block diagram of FIG. 4 and the flowchart 200 of FIG. 5. In the embodiment where the extra margin setting device 60 is implemented in a set-top box or other device outside the VCR 130, the extra margin setting device 60 may include input interfaces 620 and 630 for receiving user inputs from a combined keyboard/display input unit 610 or from a remote control console 10b. Such a remote control console 10b may be specifically designed for operation with the set-top box, or may be a universal remote control that is used for controlling several devices.

The keyboard 610 and/or remote controls shown in FIG. 4 may allow the user to program recording parameters for the VCR 130, by either designating a program listing on an EPG or manually entering the recording parameters. In the alternative embodiment, where the extra margin setting device 60 is inside the VCR 130, the EPG would not receive such parameters directly from the user, and the keyboard/display unit 610 and interfaces 620 and 630 would not be needed. Instead, the extra margin setting device 60 would only need an interface (not shown) for communicating with the recording parameter memory 50 or the VCR microcontroller 30, to receive the programmed recording parameters including the recording start and stop times and the recording start and stop dates. The setting or acquiring of programmed recording parameters is shown in step 210.

The device microcontroller 600 of the extra margin setting device 60 receives the programmed recording parameters and looks up the corresponding margin setting parameters $\Delta T_B$ and $\Delta T_E$ from memory 640 (see step 220). In an embodiment, the device microcontroller 600 may then determine whether adding the time margins defined by $\Delta T_B$ and $\Delta T_E$ would cause the recording time interval 5 to overlap with onto another previously programmed recording time interval 5, as illustrated in step 230. For instance, the VCR 130 may have been previously programmed to record another television program on another channel that ends immediately before the current programmed recording time interval 5. In this instance, adding a beginning time margin 6 to the recording time interval would cause this programmed recording time interval 5 to overlap with the previously set programmed time interval.

If the device microcontroller 600 determines that no overlap, or conflict, would result by adding the beginning and end time margins 6 and 7 to the programmed recording time interval 5, the device microcontroller 600 will adapt the programmed recording parameters to include the time margins defined by $\Delta T_B$ and $\Delta T_E$ and store the parameters in memory 640 (step 260). The device microcontroller 600 then sends the modified programmed recording parameters to the VCR 130 by using the VCR interface 650.

However, if the device microcontroller 600 determines that the addition of the time margins will cause the current recording time interval 5 to conflict with a previously programmed recording time interval 5, the device microcontroller 600 will execute a conflict resolution algorithm, as shown in step 240. This algorithm will determine how the parameters $\Delta T_B$ and $\Delta T_E$ must be modified so that the programmed recording time interval 5 will not overlap with the previously set time interval 5. This may include changing either $\Delta T_B$ or $\Delta T_E$, resulting in new parameters $\Delta T_B'$ and $\Delta T_E'$. The conflict resolution may also modify the recording parameters associated with the previously set programmed recording (e.g., by reducing its beginning or end time margin).

In one embodiment, the conflict resolution algorithm may execute rules for determining how to modify the recording parameters of the current programmed recording and the previously set programmed recording. Furthermore, priority may be assigned to one of the programmed recordings by the conflict resolution algorithm based on factors such as the time the recording was programmed, the type of television program being recorded, a priority designation from the user (e.g., high, medium, or low), etc. The rules may then reduce the programmed recording time interval 5 of the programmed recording having a lower priority, so that overlap no longer exists between the programmed recordings.

In an alternative embodiment, the conflict resolution algorithm may merely reduce the programmed recording time interval 5 of each conflicting programmed recording equally, so that the programmed recordings no longer overlap. Those of ordinary skill in the art will contemplate the different methods and algorithms that can be used to resolve such conflicts between programmed recording time intervals 5.

In step 250, the device microcontroller 600 modifies the programmed recording parameters of the current programmed recording and/or the previously set programmed recording based on the results of the conflict resolution algorithm. For example, instead of adding time margins corresponding to the originally determined $\Delta T_B$ and $\Delta T_E$ parameters, the current programmed recording time interval 5 may be modified to include time margins corresponding to the modified parameters $\Delta T_B'$ and $\Delta T_E'$. The device microcontroller 600 stores the modified parameters in the memory 640. Finally, the device microcontroller 600 sends the modified programmed recording parameters of the current programmed recording, and any programmed recording parameters of a previously set programmed recording that have been modified, to the VCR 130 through VCR interface 650.

As described above, the present invention is not limited to adding margins to a programmed recording time interval corresponding only to a VCR 130. The extra margin setting device can operate in conjunction with any type of recording device that can be programmed to record data on a storage medium during a specified time interval. For instance, the present invention can be used to expand the recording time interval 5 of any type of video or audio recorder that records television or radio programs, or multimedia presentations broadcast to a computer via the Internet.

Furthermore, the present invention can be used in conjunction with video cameras and audio recorders that are programmed to record images and/or sounds that are detected from the environment. Similarly, the present invention may be used to alter the recording time interval 5 of a system that records the inputs and interactions of a user on a computer system (e.g., applications that monitor workflow of a user in the office).

It will be obvious from the present invention described with reference to the above embodiments, that these embodiments may be varied in many ways. Such variations are not to be regarded as a departure from the spirit and scope of the invention, and all modifications as are obvious to those skilled in the art are intended to be included within the scope of the following claims.

The invention claimed is:

1. A system for recording a program, the system comprising:
   an input device for inputting a start time and a stop time for recording, said start time and said stop time defining a recording time interval;
   a margin setting device for automatically modifying said recording time interval by adding a predetermined amount of time to said recording time interval in response to receiving at least one of said start time and said stop time; and
   a recording device for recording a broadcast program on a storage medium during said recording time interval as modified.

2. The system of claim 1, wherein said input device includes a selection device for selecting a program displayed on an electronic program guide, said selected program corresponding to specific start and stop times.

3. The system of claim 2, further comprising a set-top box comprising said input device and said margin setting device.

4. The system of claim 1, wherein said input device includes an interface for manually entering the start time and the stop time for recording.

5. The system of claim 1, wherein said recording device is a video cassette recorder (VCR) and said storage medium is a magnetic tape.

6. The system of claim 5, wherein said margin setting device is implemented in said VCR.

7. The system of claim 1, wherein said margin setting device modifies said recording time interval by at least one of: moving said start time to an earlier time, said earlier time being determined in accordance with a predetermined beginning time margin; and moving said stop time to a later time, said later time being determined in accordance with to a predetermined ending time margin.

8. The system of claim 7, wherein said predetermined beginning time margin and said predetermined ending time margin are designated by a user.

9. A method of recording a program, the method comprising the acts of:
   inputting a start time and a stop time for recording, said start time and said stop time defining a recording time interval;
   automatically modifying said recording time interval by adding a predetermined amount of time to said recording time interval in response to receiving at least one of said start time and said stop time; and
   recording on a storage medium a broadcast program during said recording time interval as modified.

10. A non-transitory computer-readable medium including instructions to be executed by a computer, said medium comprising: instructions for inputting a start time and a stop time for recording, said start time and said stop time defining a recording time interval; instructions for automatically modifying said recording time interval by adding a predetermined amount of time to said recording time interval in response to receiving at least one of said start time and said stop time; and instructions for automatically programming a video recorder to record on a storage medium a broadcast program during said recording time interval as modified.

11. The system of claim 7, wherein said predetermined beginning time margin is designated by a user.

12. The system of claim 7, wherein said predetermined ending time margin is designated by a user.

13. The system of claim 1, wherein the predetermined amount of time is predefined and not settable by a user.

14. The system of claim 1, further comprising a controller configured to automatically change the predetermined amount of time to a modified amount of time for the margin setting device to add the modified amount of time to said recording time interval, in response to determining an overlap of said recording time interval with a previously programmed recording time interval.

15. The method of claim 9, wherein the predetermined amount of time is predefined and not settable by a user.

16. The method of claim 9, further comprising the act of automatically changing the predetermined amount of time to a modified amount of time for the automatically modifying act to add the modified amount of time to said recording time interval, in response to determining an overlap of said recording time interval with a previously programmed recording time interval.

17. The non-transitory computer-readable medium of claim 10, wherein the predetermined amount of time is predefined and not settable by a user.

18. The non-transitory computer-readable medium of claim 10, further comprising instructions for automatically changing the predetermined amount of time to a modified amount of time for the instructions for automatically modifying to add the modified amount of time to said recording time interval, in response to determining an overlap of said recording time interval with a previously programmed recording time interval.

* * * * *